United States Patent

Konrad et al.

[15] 3,641,566

[45] Feb. 8, 1972

[54] FREQUENCY POLYPHASE POWER SUPPLY

[72] Inventors: Charles E. Konrad; Burnette P. Chausse, both of Roanoke, Va.

[73] Assignee: General Electric Company

[22] Filed: Sept. 29, 1969

[21] Appl. No.: 861,840

[52] U.S. Cl. ..............................340/347 DA, 328/27, 328/14

[51] Int. Cl. ..................................H03b 19/00, H03r 13/02

[58] Field of Search ...............340/347 DA, 347 DD; 328/14, 328/27; 235/197

[56] References Cited

UNITED STATES PATENTS

| | | | |
|---|---|---|---|
| 2,537,427 | 1/1951 | Seid et al. | 328/27 X |
| 3,215,860 | 11/1965 | Neumann | 328/27 X |
| 3,305,675 | 2/1967 | Haase | 328/14 X |
| 3,500,213 | 3/1970 | Ameau | 328/14 |

*Primary Examiner*—Thomas A. Robinson
*Attorney*—John B. Sponsler, Gerald R. Woods, James C. Davis, Jr. and Arnold E. Renner

[57] ABSTRACT

An apparatus for providing a polyphase alternating current including a pulse generator and a digital counter for converting the pulses into a predetermined number of distinct consecutive signals which are cyclically applied to a decoding circuit for each phase, each having one output line per signal. A digital to analog converter connected to each decoding circuit designates a voltage level to each consecutive signal which is proportional to the sine of the phase angle during which the signal occurs.

7 Claims, 11 Drawing Figures

*INVENTOR.*
CHARLES E. KONRAD
BURNETTE P. CHAUSSE

FREQUENCY POLYPHASE POWER SUPPLY

BACKGROUND OF THE INVENTION

The present invention relates to an arrangement for producing alternating current and in particular to an apparatus whereby the polyphase alternating current is produced digitally.

In the conventional method a rotating generator is used in producing polyphase alternating current. This method produces alternating current of any constant frequency and voltage which may be required. However, the production of polyphase alternating current by means other than a rotating generator has many problems. For example, in a three-phase system the mechanical arrangement of the coils in the generator keeps the phases separated at 120°. In any other system, this must be performed by three individual frequency circuits which are locked together in synchronism and are displaced by 120° from each other. For very low currents, such as for example, in the microamp range, the rotating generator arrangement is undesirable since harmonics developed in the generating process cause intolerable distortions in the phases developed. In addition, where the alternating current has a variable frequency, the design of the control for the motor which drives the generator is necessarily very complicated where the accuracy required for maintaining the frequency constant at any point in the range is of a high order.

The motor generator combination is subject to wear and the control for maintaining constant frequency variable over a large range of the three-phase alternating current is subject to high initial cost.

In any other method or producing three-phase alternating current there are two functions which cause great difficulty: (1) maintaining the phases at 120° displacement and (2) the requirement of maintaining voltage linearity in all three phases over a wide range of values.

Other methods of producing a variable frequency alternating current are being used. For example, one method provides a frequency which is produced by the combination of a frequency having a range from zero to a high level and a constant frequency of a lower value, the resultant of which is passed through a filter system. Electronic filters are usually designed for specific frequencies and when used with variable frequency requirements considerable problems in design for maintaining stability in the output voltage of the system are encountered. At present the above variable frequency producing method is, however, utilized for apparatus such as three-phase cycloconverters. For that particular application, a fixed frequency is converted to a square wave for each of the three phases having a 120° displacement between them and, by applying a common variable frequency to each of these square waves, the combination produces a frequency for each of the phases which is of identical value to the frequency in the other phase, displaced 120° from each other. Since the fixed frequencies are derived from the same source and the variable frequency is applied to all of them, the resulting frequency remains in constant phase relation. The phase-to-phase voltage balance of this system may however not fulfill requirements of a wide range of frequencies.

The above system is based on the analog principle which inherently is sensitive to temperature variances.

SUMMARY OF THE INVENTION

To meet these problems the present invention teaches a digital system wherein the phase-to-phase balance can be very precisely specified. The accuracy of the digital to analog converter in the system determines the level of balance required. One advantage is that the system is totally independent of frequency, the three phases being locked in a 120° relationship by the logic circuitry which is in effect analogous to the mechanical arrangement of the example motor-generator combination. Another advantage is that the frequency produced by the system may be varied down to zero, so that reversal of the phase sequence will not disturb the magnetic circuitry of the motor which is being driven by the system. In a three-phase system the instantaneous sum of the voltages in the three phases in zero. Yet another advantage is that the present invention provides a means for maintaining this relationship over the entire range of frequencies.

DETAILED DESCRIPTION

Figure 1:
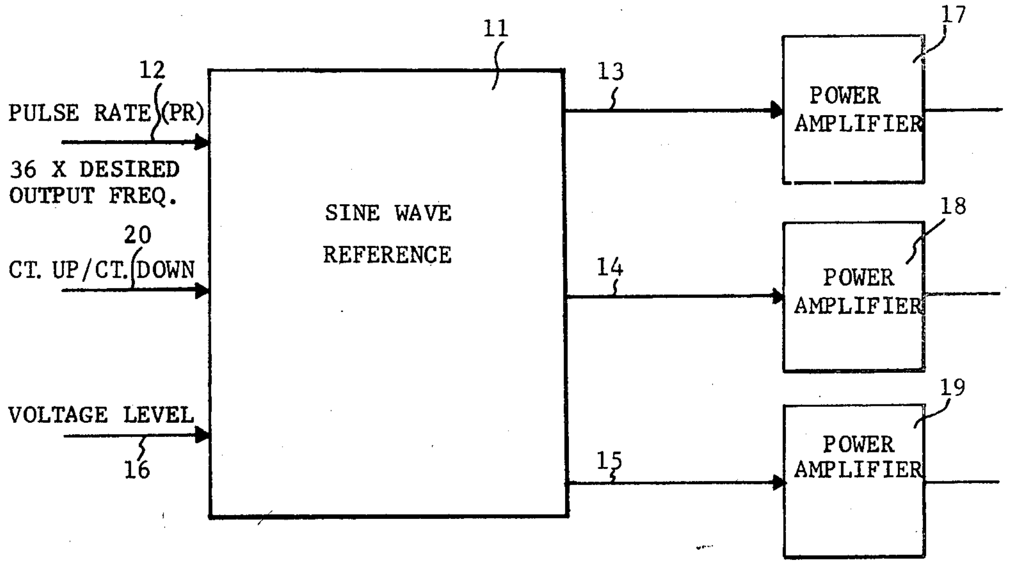
FIG. 1 shows a block diagram of a three-phase sine wave reference circuit presenting input and output signal relationship.

Refer now to FIG. 1 wherein a sine wave reference circuit 11 having output terminals 13–15 provides a three-phase AC supply to three power amplifiers 17–19, respectively. Each of the power amplifiers 17–19 amplifies the individual phase current applied thereto for use with other equipment such as cycloconverters, inverters and the like. An input pulse rate terminal 12 receives pulses of variable pulse rate from a pulse generator (not shown). The ratio of input pulses to AC frequency output is fixed so that with adjustment of the rate of input pulses the frequency of the output signal from the sine wave reference circuit 11 is varied proportionally.

A voltage level input 16 to the sine wave reference circuit 11 is provided for adjustment of the current level of the alternating current output sine wave with respect to the frequency thereof. It is desirable to maintain a constant amplitude of the current wave; i.e., the peak of the current must always be the same independent of the frequency. If the load in the system has resistive value only, then the current reference wave amplitude has a fixed value independent of frequency; however, should the load be an ideal inductor (having no resistive value) then the applied volt-seconds per cycle should be independent of frequency, i.e., a reference wave of which the amplitude is directly proportional to the frequency. In practice all inductive loads have a resistive component, hence at zero frequency some voltage other than zero is necessary to achieve the desired current level. The voltage level thus moves with the frequency, but is offset by an amount which is equal to the voltage drop across the resistive component of the inductive load for a predetermined current level.

A third input signal 20 applied to sine wave reference circuit 11 determines the phase sequence of the three phases 13–15 of the output of the sine wave reference, thereby allowing reversing of the phase sequence, an explanation thereof to follow.

Figure 2:
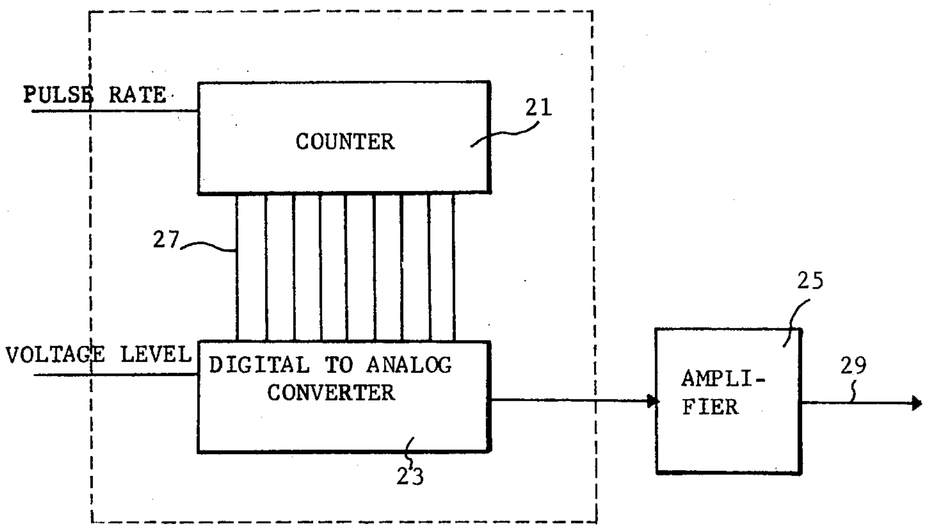
FIG. 2 represents the sine wave reference circuit as adapted to single-phase use.

FIG. 2 shows a single-phase version of the sine wave reference circuit including a counter 21 and a digital to analog converter 23, the output of which is applied to power amplifier 25 having an output 29. In this version a counter 21 is used for providing a number of parallel paths, each of which is consecutively energized for a predetermined number of degrees whereby a series of incremental divisions of each cycle of the alternating current output are produced. In the example one cycle is divided in 10° increments so that a total of 36 output paths 27 from counter 21 to the digital to analog converter 23 are required for producing one cycle of alternating current. The angle of each of the increments, also determines the number of pulses required for the input of the counter 21, for example, the input frequency of pulses for 10° increments is 36 times that of the output frequency of the AC current. The number of divisions of the AC cycle may be changed to suit the conditions required, hence an increase in divisions will provide smaller steps and will closer simulate a pure sine wave than the 36 increments of the present example; and similarly a decrease in divisions will create greater steps and will more coarsely simulate the pure sine wave.

A decoding means (not shown) may be necessary for converting the pulse rate to the series of consecutive signals 27 to make the output of 21 compatible with the digital to analog converter 23. In the example, the binary counter having a six-bit capacity requires a decoder so that each of the 36 states of counter 21 is converted to one of 36 consecutive output terminals. This is analogous to a rotating switch having 36 contact points, each of which is energized by the rotor, contacting each of the points consecutively. The resulting 36 consecutive signals are applied to the digital to analog converter 23 wherein these 36 signals are translated into a combination of current level signals, each of which is proportional to magnitude of sine of the angle during which the signal occurs.

FIG. 3 shows the pulse input to the counter. A pulse is applied to the counter at 10° intervals of the entire sine wave. Thus, at 0°, which coincides with 360° of the preceding cycle, the counter is reset to 0 causing all six bits of the counter to be reset to 0. The 10° pulse sets the counter to 1, 20° pulse sets the counter to 2, 30° pulse sets the counter to 3, continuing to 350° at which time the counter is set to 35. The 36th count occurs at 360° and resets the counter to 0 which is also the zero position of the next cycle. Each of the counts is decoded by the decoding circuit thereby producing 36 consecutive signals, each having a duration of 10° of the cycle. Thus, at a count of 0 the decoder produces a signal lasting 10°, at the count of 1 the decoder produces another signal lasting 10°, at the count of 2 the decoder produces yet another signal lasting 10°, continuing on till the final count of 360, at which time the cycle is repeated.

Figures 3A, 3B, 3C:
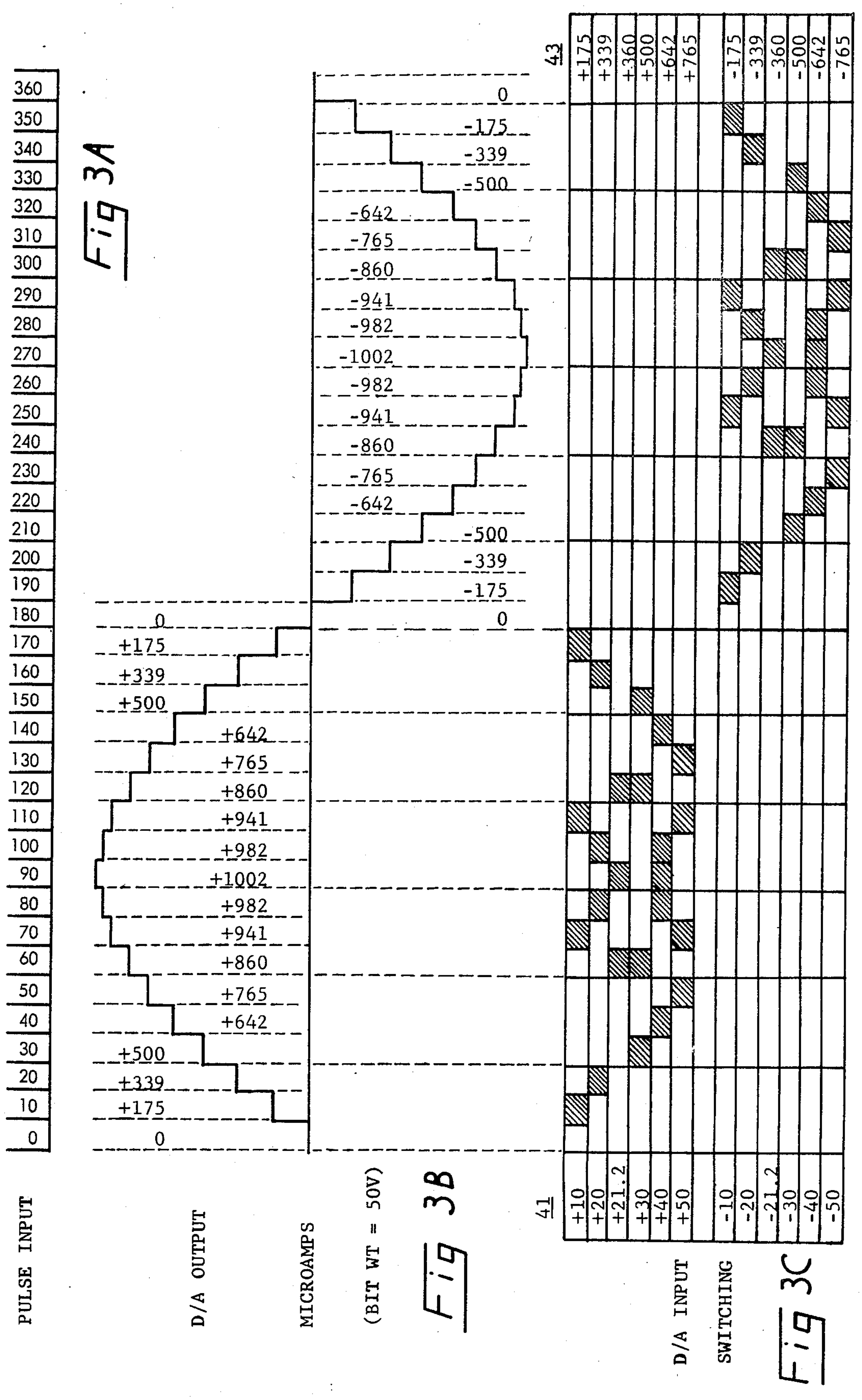
FIG. 3A represents the pulse input to the counter for a period of one cycle.
FIG. 3B shows the output of the digital to analog converter.
FIG. 3C is the truth table of the switching input to the digital to analog converter.

To produce an approximation to the sine wave characteristic of alternating current, a current level value is applied to each of the signals thus produced which is approximately equal to the sine of the angle during which the signal occurs. Various types of digital to analog converters are available, hence it is possible to utilize a resistance-type digital to analog converter wherein a different value resistor for each step of the sine wave produces a correspondingly different current level by using a constant voltage across the resistors. This would require switching means for nine separate resistance paths for the positive side of the sine wave and nine resistors and associated switching means for the negative side of the sine wave. The present invention utilizes six resistance paths and switching means by using the resistance paths individually and in combination with each other for providing a current flow which is proportional to the value of the sine of the mean angle during which the paths are being used. In FIG. 3C, column 41, the sine of the angles used, either singularly or in combination, is shown for both the positive and negative portions of the cycle. Using a positive and a negative 50-volt supply, the values resulting from the combination of the sine of these angles are shown in column 43 in microamps, the voltage for the positive side of the cycle being positive and a negative voltage resulting in negative values for the negative portion of the cycle. FIG. 3B shows the output of the digital to analog converter in microamps resulting from the digital to analog input switching shown in FIG. 3C. Hence, the sine of +10° produces 175 microamps over the period of between 10° and 20° of the cycle. The sine of 20° produces a +339 microamps for the duration of 20° to 30° of the cycle. The sine of 30° produces +500 microamps for the period of 30° to 40° of the cycle. The sine of 40° produces 642 microamps for the period of between 40° and 50° of the cycle and the sine of 50° produces 765 microamps for the period of between 60° and 70°. The combination of the sine of 21.2° and the sine of 30° produces 860 microamps during the period of 60° to 70° of the cycle. The sum of the sine of 50° and the sine of 10° produces 941 microamps for the 10° period between the 70° and 80° cycle. The combination of the sine of 40° and the sine of 20° produces 982 microamps during the period elapsed between 80° and 90° and a combination of the sine of 40° and the sine of 20° produces 1,002 microamps. The second quarter of the cycle is identical to the first quarter with the value diminishing from the maximum of 982 microamps to 0 during the period of from 100° to 190°. The portion of the cycle from 190° to 360° is identical to the 0°–190° portion with the values being of negative polarity. The switching combination for each of the 10° increments of the sine wave are shown in FIG. 3C by cross-hatched blocks during which time the combination of resistance paths are energized.

Thus, there are in effect two decoding circuits involved in the system as described above. One decoder is used to convert the output of the counter from a binary code to a series of pulses each applied to consecutive output leads, and a second to provide a switching means for resistor bridges which are so arranged to provide a current through each of the above consecutive output leads for the construction of an alternating current which closely simulates a true sine wave.

The voltage level input 16 (FIG. 1) which adjusts the current level output of the alternating current output functions by varying the voltage level of the positive and negative supply busses (not shown). The values shown in column 43, in FIG. 3, will be reduced proportionally to the reduction of voltage from the original 50-volt value of the busses. This varying of voltage level of the busses is well known in the art and may be performed by a pair of operational amplifiers, one having a scaling factor of ONE and the other having a predetermined scaling factor. Since the output of operational amplifiers is always the inversion of its input the operational amplifier having the scaling factor of ONE merely inverts the output of the other amplifier for the purpose of providing a negative voltage output having the identical amplitude of the other, the positive voltage output. A change of the scaling factor will cause a change in the amplitude of the output in both the positive and the negative busses. Another means for providing a variable voltage is to have resistor bridge arrangements for both the positive and negative bus output signals.

In a three-phase system as shown in FIG. 1 a counter produces the required coded output of 36 counts for producing the 36 10° incremental steps as described for the single-phase version. A decoder converts this coded output to a series of output signals, each signal being sequentially produced from 36 output lines. This decoder is not required when an apparatus is used having an output which provides the necessary 36 sequential output signals such as a rotary switch, a distributor, or the like.

Each of the 36° lines from decoding circuit are applied to a series of NAND circuit. A NAND circuit produces a binary ZERO output when all of its input signals are binary ONE. If any one of the input signals is a binary ZERO, its output signal is a binary ONE.

Figure 4:
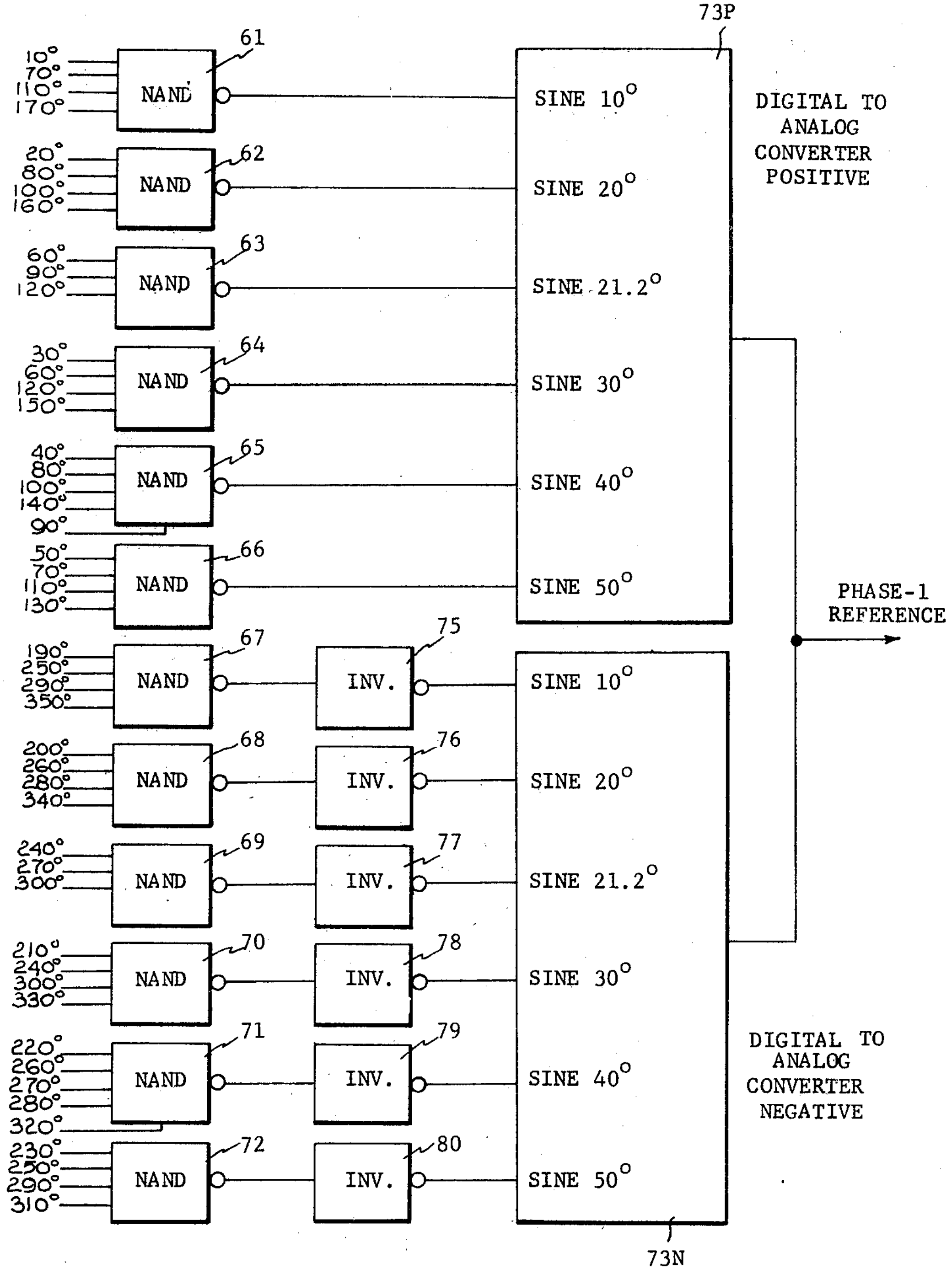
FIG. 4 shows the switching circuitry to the digital to analog converter of phase 1.

Referring now to FIG. 4 NAND-circuits 61–72 normally receive binary ONE signals from the 36° lines. For example, NAND-circuit 61 has input signals from the 10°, 70°, 110° and the 170° lines. Similarly NAND-circuit 65 receives signals from the 40°, 80°, 100°, 140° and 90° lines. All other NAND-circuits 62–64 and 66–72 are similarly receiving signals from the degree lines as shown in the drawing. Since the input signals to each of the NAND circuits are normally binary ONE signals, the output signals therefore are normally binary ZERO; however, as each of the degree lines for a 10° period is energized with a binary ZERO signal, the output of the NAND circuit to which the binary ZERO signal is applied produces a binary ONE output signal. For example, NAND-circuit 61 normally has binary ONE signals applied to its input leads 10°, 70°, 110°, and 170°. However, during the interval from 10° to 20° of the cycle, a binary ZERO signal is applied to the 10° input similarly during the periods from 70° to 80° and 110° to 120° and again during the period from 170° to 180°. During these periods, the output of the NAND-circuit 61 changes from a binary ZERO to a binary ONE signal, which is applied to the digital to analog converter 73P wherein the appropriate current of positive polarity is produced in response to the applied signal. Another example is in NAND-circuit 65 having input leads of 40°, 80°, 100°, 140° and 90°, which normally have binary ONE signals applied thereto. During the period from 40° to 50°, the input signal to the 40° line is changed to a binary ZERO causing the output of the NAND circuit to change to a binary ONE. Similarly, the output of NAND-circuit 65 is changed to a binary ONE during the interval from 80° to 90°, and 100° to 110°, and 140° to 150° and again during the interval from 90° to 100°. All other NAND-circuits 62–64 and 66–72 operate in the same manner. Referring to FIG. 3C it can be seen that the 10° line is energized during the periods described above with respect to NAND-circuit 61, and similarly that the 40° line is energized during the periods described above with respect to NAND-circuit 65. In FIG. 3C it is shown that during the interval of 80° to 90° a current must be developed which is equivalent to the sum of the sine of 20° and the sine of 40°; hence when referring to FIG. 4, both the NAND circuits providing this switching combination must be energized which is evidenced by the input lines 80° to NAND-circuits 62 and 65.

The output signals from NAND-circuits 67–72 are inverted by inverters 75–80, respectively, before being applied to the digital to analog converter 73N whereby the negative portion of the sine wave of the developed alternating current is produced. The inverter circuit as shown in FIG. 4 inverts the input signals so that when a binary ONE signal is applied to the input of the inverter circuit the output signal thereof is a binary ZERO and similarly when a binary ZERO is applied to the input of the inverter the output thereof is a binary ONE. Hence when any of the input leads of NAND-circuits 62–72 has a binary ZERO applied thereto the output of the NAND circuit involved in a binary ONE, which is then applied to one of inverter circuits 75–80, respectively, causing the output thereof to be a binary ZERO which is applied to the digital to analog converter 73N. The output of both the positive digital to analog converter 73P and the negative digital to analog converter 73N is applied to the reference amplifier (not shown) to provide a voltage sine wave for phase 1.

Figure 5:
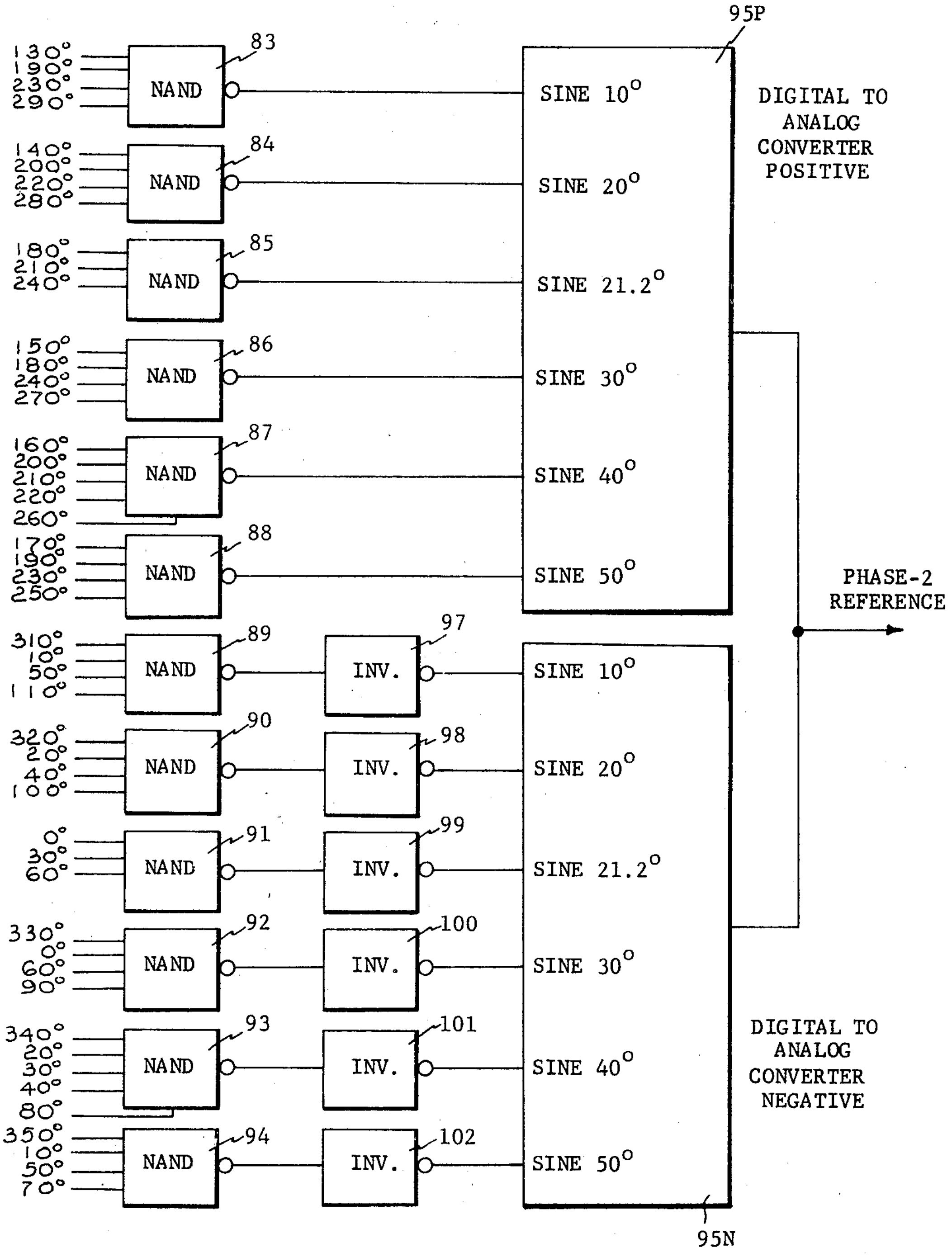
FIG. 5 shows the switching circuitry to the digital to analog converter of phase 2.

Phase 2 sine wave (FIG. 5) is developed in a similar manner by a second series of NAND-circuits 83–94 having degree line input leads from the decoding circuit (FIG. 1). Since in a three-phase circuit each of the phases is displaced by 120° from each of the other phases it is necessary that the input leads to the NAND-circuits 83–94 be connected to degree lines which cause energization of the particular NAND circuit to be 120° displaced from its equivalent component in the other phases. Thus NAND-circuit 83 has an equivalent NAND-circuit 61 in phase 1 (FIG. 4) which receives binary ZERO signals at 10°, 70°, 110° and 170°. Phase 2 (FIG. 5) is displaced by 120° from phase 1 which determines that NAND-circuit 83 must receive input signals at 130°, 190°, 230° and 290° to produce a sine wave which has a current level value equivalent to the sine of 10°.

Similarly NAND-circuit 87 has an equivalent NAND-circuit 65 in phase 1 (FIG. 4) which receives binary ZERO input signals at 40°, 80°, 90°, 100° and 140°. The 120° displacement of phase 2 from phase 1 determines that the input signals applied to NAND-circuit 87 occur at 160°, 200°, 210°, 220° and 260°. NAND-circuits 89–94 have output signals which are applied to inverter circuits 97–102, respectively, wherein the signals are inverted to be applied to the digital to analog converter 95N to produce the negative portion of the sine wave of phase 2. The output signals produced by the NAND-circuits 83–88 are applied to the digital to analog converter 95P which then produces the positive portion of the sine wave of phase 2.

Figure 6:
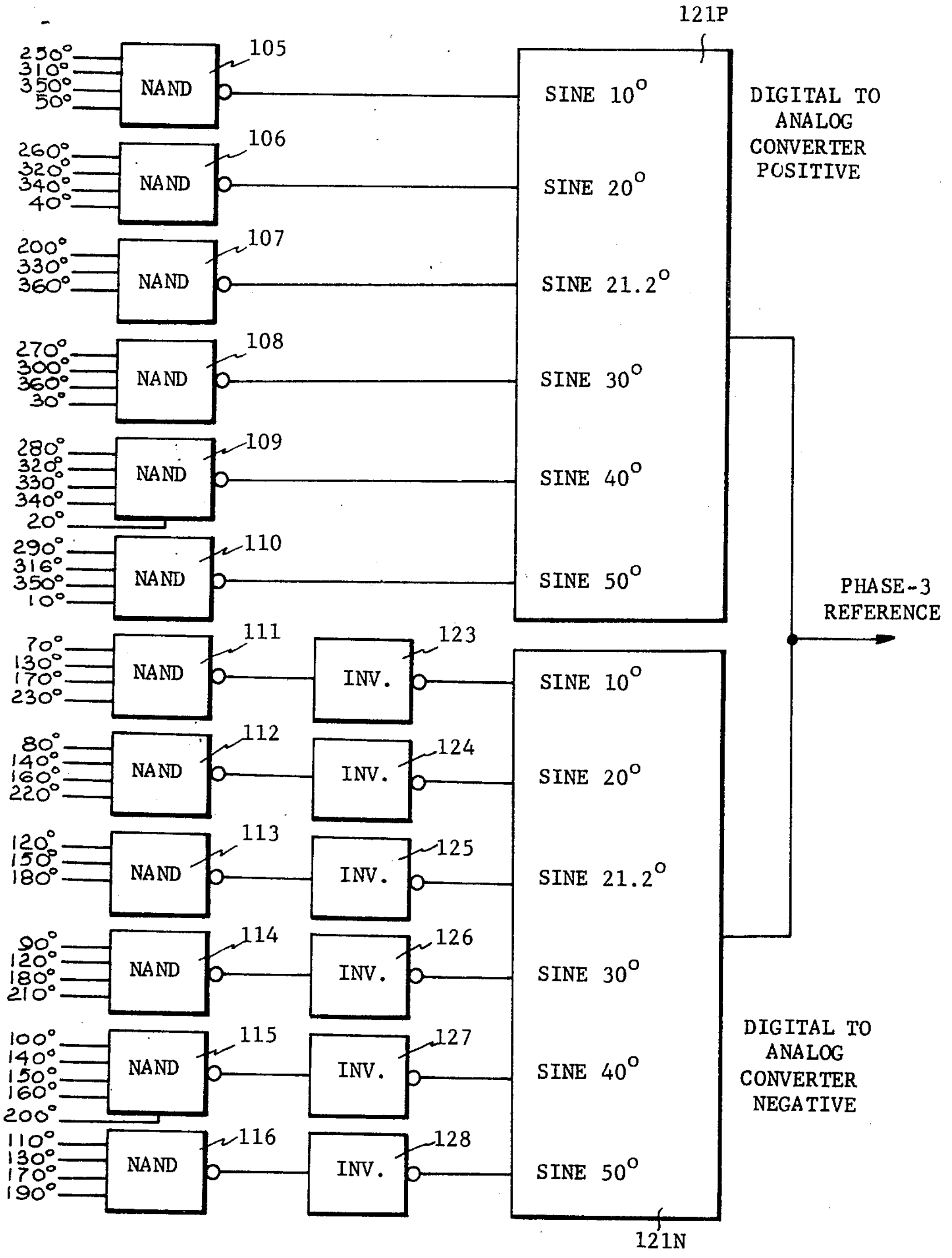
FIG. 6 shows the switching circuitry to the digital to analog converter of phase 3.

Phase 3 (FIG. 6) is similarly displaced from the other two phases by 120° so that the sine wave constructed by the signal application to the NAND-circuits 105–116 must be displaced by 120° from those applied to the equivalent NAND-circuits 83–94 in phase 2 (FIG. 5) and NAND-circuits 61–72 in phase 1 (FIG. 4). Thus, for example, the input signals to NAND-circuit 105 occur at 250°, 310°350° and 50 ° and the equivalent NAND circuit in phase 2 (FIG. 5) receives its signals at 130°, 190°, 230° and 290°, and the signals equivalent thereto applied to NAND-circuit 61 of phase 1 (FIG. 4) occur at 10°, 70°, 110° and 170°, each of which is displaced from the signals applied to the other phases by 120°. In phase 3 the output of NAND-circuits 105–110 is applied to the digital to analog converter 121P to produce the positive portion of the alternating current sine wave. NAND-circuits 111–116 have output signals applied to inverter circuits 123–128 which invert the signals and in turn apply their output signals to the digital to analog converter 121N wherein these signals produce the negative portion of the alternating current sine wave. The output of digital to analog converters 121P and 121N are applied to a reference amplifier (not shown) for producing a voltage signal proportional to the current output of the digital to analog converters.

Figure 7:
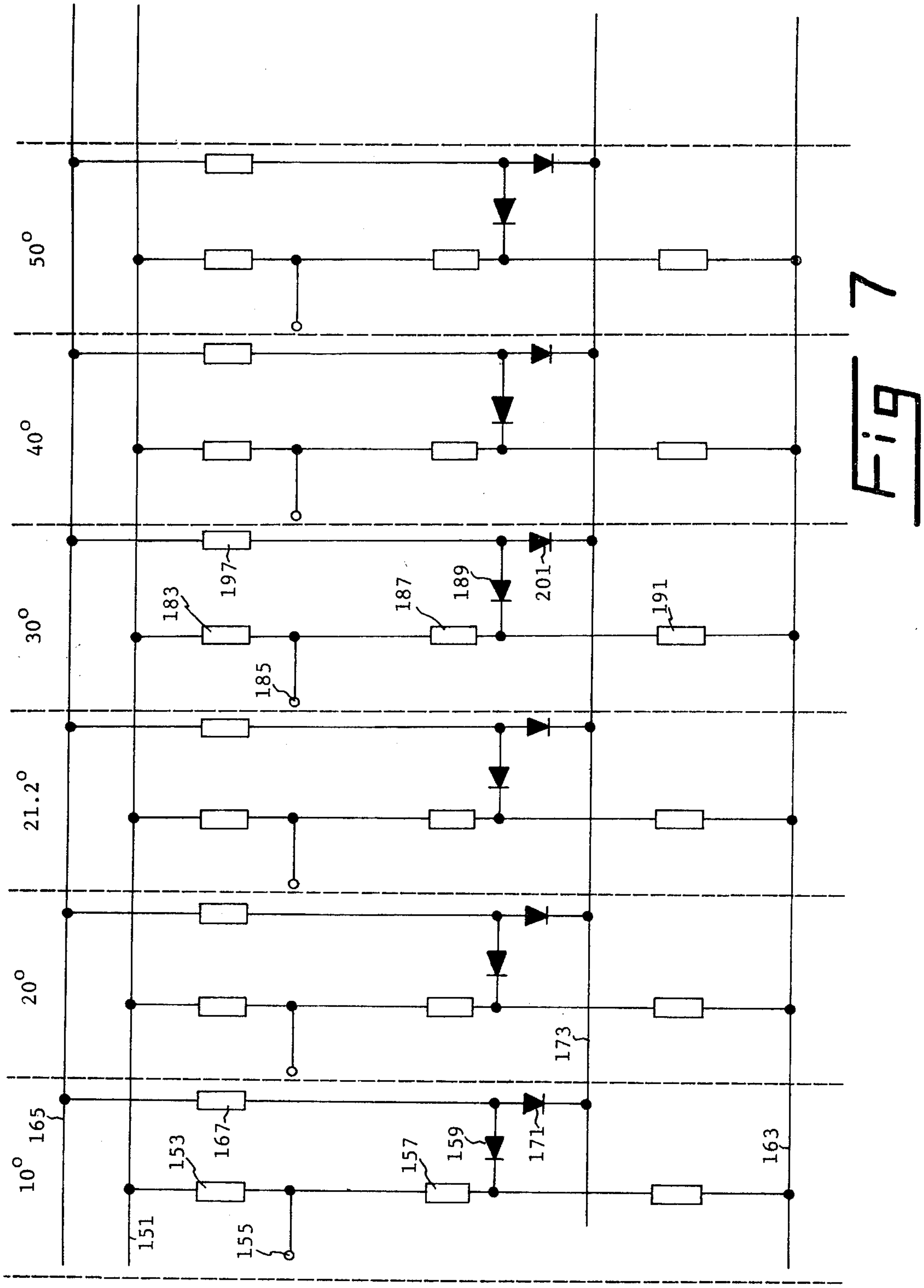
FIG. 7 shows the circuitry of the positive portion of the digital to analog converter.

Refer now to FIG. 7 wherein the internal circuit of each of the digital to analog converters 73P, 95P and 121P for the positive portion of the sine wave are described. The digital to analog converter has a series of similar resistor circuits 10°, 20°, 21.2°, 30°, 40° and 50°, respectively. These circuits are similar in that only the value of the individual resistors in each of the circuits are different from the individual resistors in the other circuits, so that as each of the circuits is energized the current value from the summing junction of all the circuits is proportional to the sine of the angle during which interval the specific circuit is energized. Thus, in the interval of 10° to 20° the output of the 10° circuit provides a current proportional to the sine of the angle of the interval (10°). Similarly, the 20° circuit causes the summing junction to produce a current proportional to the sine of an angle of the interval from 20° to 30° (20°). In cases where the current is provided by a combination of the sines of the angles such as the case of the 70° to 80° interval of the cycle consisting of the sum of the sine of 10° and 50°, as shown in FIG. 3C, the summing junction will provide an output having a combined value of the output of the 10° circuit and the 50° circuit (FIG. 7).

The operation of each of the circuits is as follows. A 50-volt positive bus having a connection to each of the resistor circuits 10°, 20°, 21.2°, 30°, 40° and 50° is in the 10° resistor circuit connected through resistor 153 to input lead 155 and resistor 157. The other side of resistor 157 connects to the cathode of diode 159 and through resistor 161 to the 50-volt negative bus 163 which connects to each of resistor circuits 20°, 21.2°, 30°, 40°, and 50°. A bit weight bus 165 connected to all the resistor circuits connects to the 10° circuit through resistor 167 to the anode of diodes 159 and diode 171, the cathode of the latter being connected to summing junction 173.

All other resistance circuits 20°, 21.2°, 30°, 40°, and 50° are identically connected. For example, the 30° circuit has bus 151 connected through resistor 183 to input lead 185 and resistor 187 which has its other side connected to the anode of diode 189 and to resistor 191 which in turn is connected to the 50-volt negative bus 163. The bit weight bus 165 connects through resistor 197 to the anodes of diode 189 and to diode 201 having its cathode connected to the summing junction 173. The selection of the resistors in each of the circuits is such that with a binary ONE signal, that is a signal having a predetermined positive voltage, applied to the input lead 155, current will flow from the positive bus 151 through resistors 153, 157 and 161 to the negative bus 163. This current will provide a positive voltage at the anode of cathode 159. Since the summing junction voltage level is at almost ZERO voltage level, the anodes of diodes 171 and 159 are at approximately 0.6 volts positive. The bit weight bus having a voltage of positive polarity now causes current to flow through resistors 167 and 169 through diode 171 into the summing junction 173, thereby providing an output current of the digital to analog converter. The voltage level of the bit weight bus may be changed over a wide range to provide a range of output currents on the summing junction 173 for compliance with the frequency changes.

If now the input to input lead 155 is changed from a binary ONE signal to a binary ZERO signal, which is a zero volt signal, then current from the input lead 155 will flow through resistor 157 and 161 to the negative bus 163. This causes a voltage of negative polarity to be developed at the cathode of diode 159, which then conducts current from the bit weight bus 165 having a positive polarity through resistors 167 and 161 to the negative bus 163. This then diverts the current previously flowing through diode 171 to the summing junction 173 away therefrom, resulting in no output from the digital to analog converter.

To produce the proper sine wave required for the developed alternating current output of the digital to analog converter, many different values of resistors in combination may be used to achieve the desired results and similarly the voltage of the positive and negative bus and the common bus may be of any suitable value. For example, the voltage level of both the positive and negative bus is 5 volts, the voltage of the summing junction is very close to zero—say about 0.005 volt; and the voltage applied to the bit weight bus has a maximum value of 50 volts. With these voltages applied to each of the circuits of the digital to analog converter, the following tabulation of resistors is one example of a combination which provides a close approximation to a pure sine wave.

| Circuit | 153 | 157 | 161 | 167 |
|---|---|---|---|---|
| 10° | 33.2K | 2.21K | 39.2K | 282K |
| 20° | 18.2K | 1.21K | 22.1K | 145.6K |
| 21.2° | 18.2K | 1.21K | 22.1K | 136.9K |
| 30° | 18.2K | 1.21K | 22.1K | 98.9K |
| 40° | 12.1K | 8.25K | 15K | 76.9K |
| 50° | 12.1K | 8.25K | 15K | 64.5K |

Figure 8:
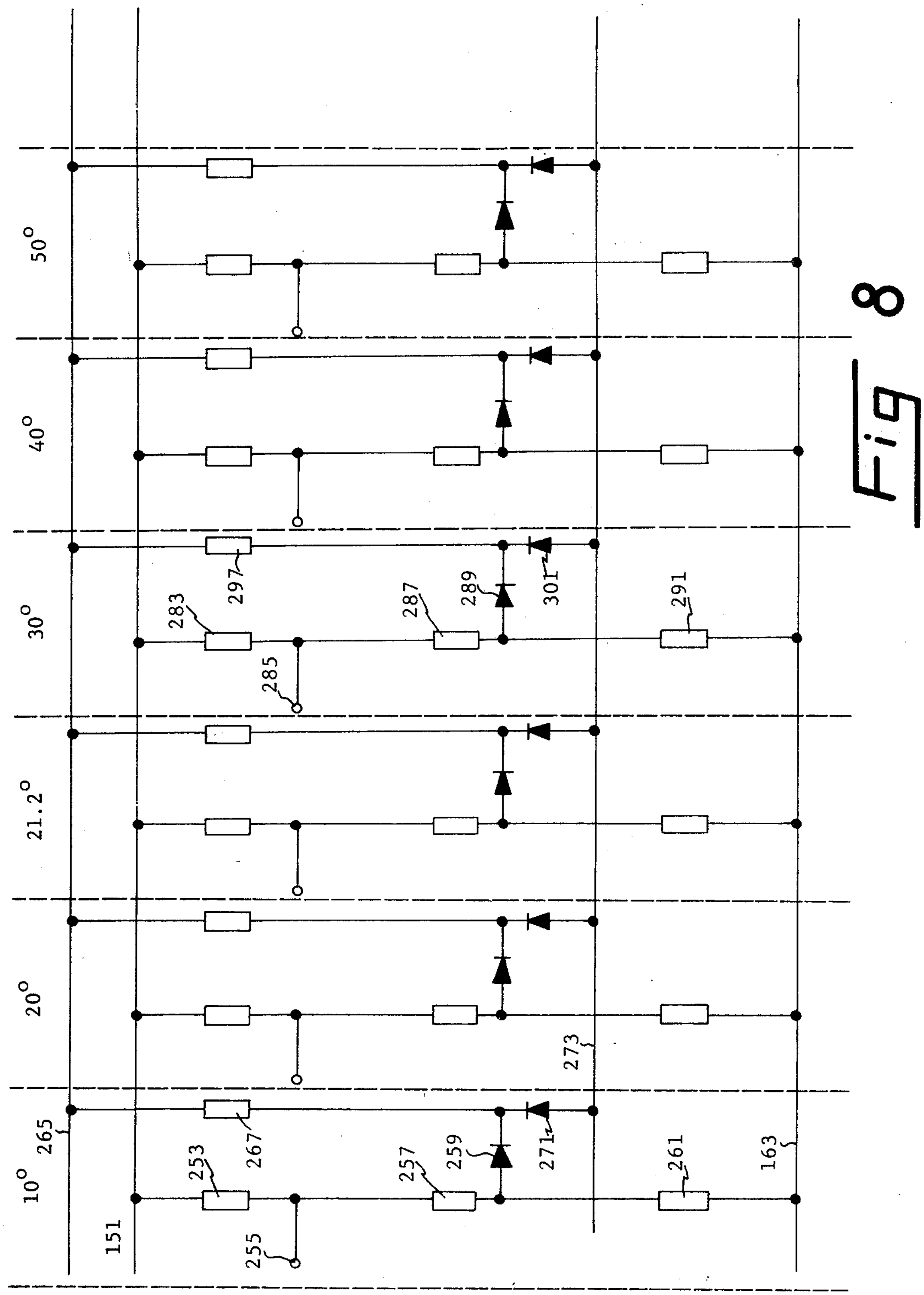
FIG. 8 shows the circuitry of the negative portion of the digital to analog converter.

The negative portion of the digital to analog converter (FIG. 8) is similar to the positive portion thereof with the exception that the current is made to flow in a different direction by reversing the polarity of the diodes. Thus, in the 10° resistor circuit a positive voltage bus 251 connects through resistor 253 to input lead 255 and one side of resistor 257 which on the other side is connected to the anode of diode 259 and through resistor 261 to the negative voltage bus 263. A bit weight bus 265 having a negative polarity connects through resistor 267 to the cathode of diode 259 and to the cathode of diode 271 which has its anode connected to the summing junction 273. All other circuits, 20°, 21.2°, 30°, 40° and 50° are connected identically to the above-described 10° circuit. For example, the positive voltage bus connects to the 30° circuit through resistor 283 to the input lead 285 and one side of resistor 287 which has its other side connected through resistor 29 to the negative voltage bus 163 and to the anode of diode 289. The bit weight bus 162 connects through resistor 297 to the cathodes of diodes 289 and 301. Diode 301 has its anode connected to the summing junction 273.

The selection of the resistor values in each of the circuits is such that a binary ONE signal, that is a signal having a predetermined positive voltage level, applied to the input lead 255 will cause a positive voltage to be applied to the anode of the cathode 259, which causes a positive voltage to develop at the junction of the cathodes of diodes 259 and 271. Since the summing junction voltage level is almost at a zero level, no current flows therefrom to the bit weight bus 265 having a voltage level of negative polarity. When, however, a binary ZERO signal, that is a signal having a zero voltage level, is applied to the input lead 255 current will flow from input terminal 255 through resistors 257 and 261 to negative bus 163. This causes diode 259 to be reverse biased, causing current to flow from the summing junction 273 through diode 271 to the negative bit weight but 265. The other circuits 20°, 21.2°, 30°, 40° and 50° have identical functioning operation as described above.

The summing junctions 173 (FIG. 7) of the positive portion of the digital to analog converter and 273 (FIG. 8) of the negative portion of the digital to analog converter are connected together and to an operational amplifier (not shown) which utilizes the varying current signals for producing a sinusoidal alternating current voltage signal. Each of the three phases of the system is equipped with an identical digital to analog converter whereby the three-phase alternating current system is produced.

Figure 9:
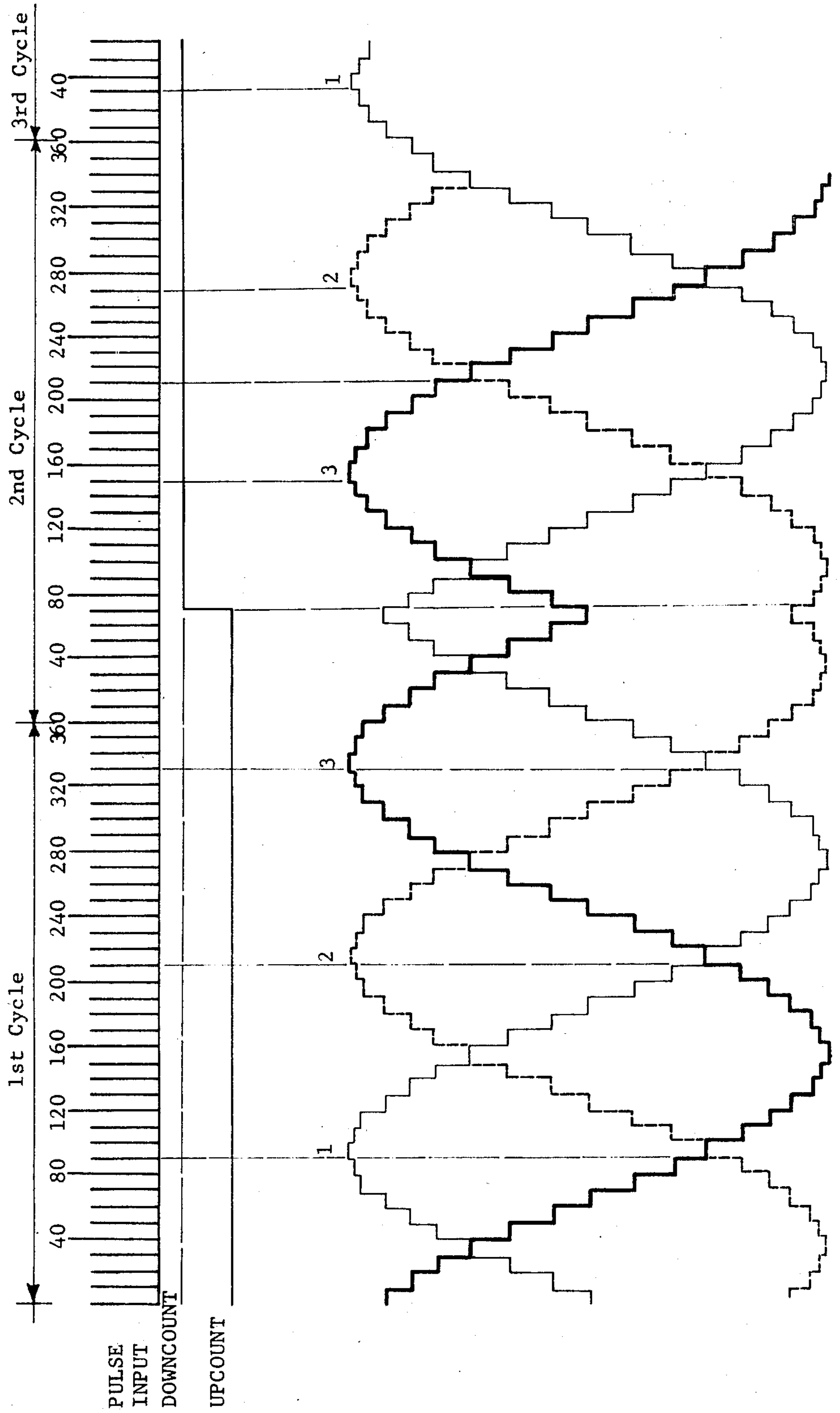
FIG. 9 shows the resultant waveforms during phase reversal in a three-phase system.

Reversal of phase sequence is performed by changing the counting sequence from forward to reverse and vice versa. FIG. 9 shows the order of reversal of the phase. The pulse input to the counter is shown to span several complete cycles, each pulse occurring at 10° intervals which then results in the formation of a three-phase system having phase 1 reach its maximum positive amplitude at 90°, phase 2 reaching its maximum positive amplitude 120° later at 210°, and phase 3 having a maximum positive amplitude at 330°. These amplitudes occur at the above-designated points because of the configuration of the digital to analog converter which in response to a particular count produces a predetermined voltage level. Thus, the count equivalent to 90° produces maximum positive amplitude for phase 1 and 50 percent negative amplitude for phases 2 and 3. Similarly, the count equivalent to 210° produces maximum positive amplitude for phase 2 and 50 percent negative amplitude for phases 1 and 3. Phase 3 similarly attains maximum positive amplitude when the count equivalent to 330° occurs, while at that angle phase 1 and 2 reach 50 percent negative amplitude.

If now the counting sequence is reversed as is shown to occur at 70° in the second cycle and the counter is caused to count down in the place of counting up, the direction of each of the phases is correspondingly reversed, hence phase 1 which would have reached maximum amplitude at 90° in the second cycle now follows a diminishing path through zero and then negative polarity, phase 2 which has reached maximum negative amplitude at 30° in the second cycle now will again reach that amplitude at 90°, and phase 3 which has a zero amplitude at 60° and was about to go negative in polarity instead will go positive again and reach maximum positive amplitude at 150° in the second cycle. The order of phase rotation has thus reversed itself since now phase 3 will have maximum positive amplitude first at 150°, phase 2 will have maximum positive amplitude next at 270°, and phase 1 will attain maximum positive amplitude at 30° in the third cycle. Thus, the phase rotation order, phase 1, phase 2, and phase 3, during the countup function of the counter is changed to a phase 3, phase 2 and phase 1 order. Reversal of the counter, therefore, changes the phase sequence of the alternating current whereby rotation of equipment used in conjunction with the above-described sine wave reference circuit is reversed.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A sine wave reference circuit of the type wherein a frequency source provides pulses to an input of a counter, the output of which is a plurality of electrical signals which are applied to a decoding circuit having a number of output terminals for conducting an equal number of output signals produced in predetermined order by the decoding circuit in response to the output of the counter, and a digital to analog converter, an improvement in said digital to analog converter comprising:

a. means for receiving the number of output signals from the decoding circuit; and, b. means for selectively converting said output signals singularly and in predetermined combinations to a plurality of current signals of predetermined levels which in sequential occurrence cyclically approximate a sine wave shape consisting of a predetermined number of steps, said number of output signals being less than the number of steps constituting one-quarter of the sine wave shape period.

2. The invention in accordance with claim 1 wherein said means for selectively converting said output signals includes:

a. means for producing a plurality of current signals the amplitudes of which are respectively proportional to the sine of predetermined angles; and, b. means for selectively utilizing said current signals singularly and in predetermined combinations to produce a total current which approximates said sine wave shape.

3. A sine wave reference circuit for providing a polyphase output, comprising:

a. a frequency source for producing pulses;

b. a digital counter for accumulating said pulses and producing electrical output signals representative of the contents of the counter;

c. a decoding circuit for each phase of said polyphase output connected to said counter, each of said decoding circuits including means for producing a number of output signals either singularly or in predetermined combinations in response to the output of said counter, each of said signals being individually applied to a respective terminal; and, d. a digital to analog converter for each of said phases connected to said terminals for converting said output signals singularly and in predetermined combinations from said decoding circuit to a plurality of current signals of predetermined levels which in sequential occurrence cyclically approximate a sine wave shape consisting of a predetermined number of steps, said numbers of output signals being less than the number of steps constituting one-quarter of the sine wave shape period.

4. The invention in accordance with claim 3 wherein said digital to analog converter includes means for producing a plurality of current signals, the amplitudes of which are respectively proportional to the sine of predetermined angles and means for selectively utilizing said current signals singularly and in predetermined combinations to produce a total current which approximates said sine wave shape.

5. The invention claimed in claim 3 wherein said digital counter is reversible so that phase rotation of said polyphase output may be reversed.

6. A digital to analog converter comprising:

a. a number of input connections to which electrical signals are applied in predetermined order; and, b. means for converting said electrical signals to produce a number of sequential current signals the amplitudes of which form a stepped sine wave shape in which the number of steps constituting one-quarter of the sine wave shape period exceeds the number of said electrical signals.

7. The invention claimed in claim 6 wherein the converting means comprises six current sources having outputs applied to said input connections representing current amplitudes proportional to the sine of angles of 10°, 20°, 30°, 40°, 50° and 21.2°, used singularly and in predetermined combinations to produce a total current which approximates a sine wave shape.

* * * * *